United States Patent [19]

King

[11] Patent Number: 4,744,208

[45] Date of Patent: May 17, 1988

[54] RAKE HEAD

[75] Inventor: George E. King, Greensboro, N.C.

[73] Assignee: The Disston Company, Greensboro, N.C.

[21] Appl. No.: 946,201

[22] Filed: Dec. 24, 1986

[51] Int. Cl.[4] .......................... A01D 7/02; A01D 7/08
[52] U.S. Cl. ............................... 56/400.16; 56/400.17; D8/13
[58] Field of Search ........... 56/400.08, 400.16–400.21; 172/378, 379, 380; D8/13

[56] References Cited

U.S. PATENT DOCUMENTS

| | | | |
|---|---|---|---|
| 531,722 | 1/1895 | Hart | 56/400.16 |
| 1,925,357 | 9/1933 | Withington | 56/400.18 |
| 2,705,394 | 4/1955 | Steensen | 56/400.08 |
| 2,883,820 | 4/1959 | Bissell | 56/400.17 |
| 3,332,223 | 7/1967 | Polisso | 56/400.17 |
| 4,215,528 | 8/1980 | Fodor | 56/400.17 |
| 4,351,145 | 9/1982 | Farkas | 56/400.19 |

FOREIGN PATENT DOCUMENTS 1928406 12/1970 Fed. Rep. of Germany ... 56/400.16
125244 6/1949 Sweden .............................. 56/400.16

Primary Examiner—John Weiss
Attorney, Agent, or Firm—Burns, Doane, Swecker & Mathis

[57] ABSTRACT

The present invention relates to a rake head for a lawn or garden rake having plural rows of tines. The rake head includes a support member having a first and second edge. The rake head has a first and a second row of tines to be retained such that they have a substantially equal degree and range of movement and stress in a generally upward direction. Further, a first plurality of tines attached to a substantially planar support member defines a first plane that is intersected by a second plurality of tines attached to the support member and defines a second plane. Each of the tines of the second plurality of tines extends between and adjacent the tines of the first plurality of tines outside of the second edge. A separation of the tines is provided, thus forming two substantially identical rows of raking tines.

17 Claims, 2 Drawing Sheets

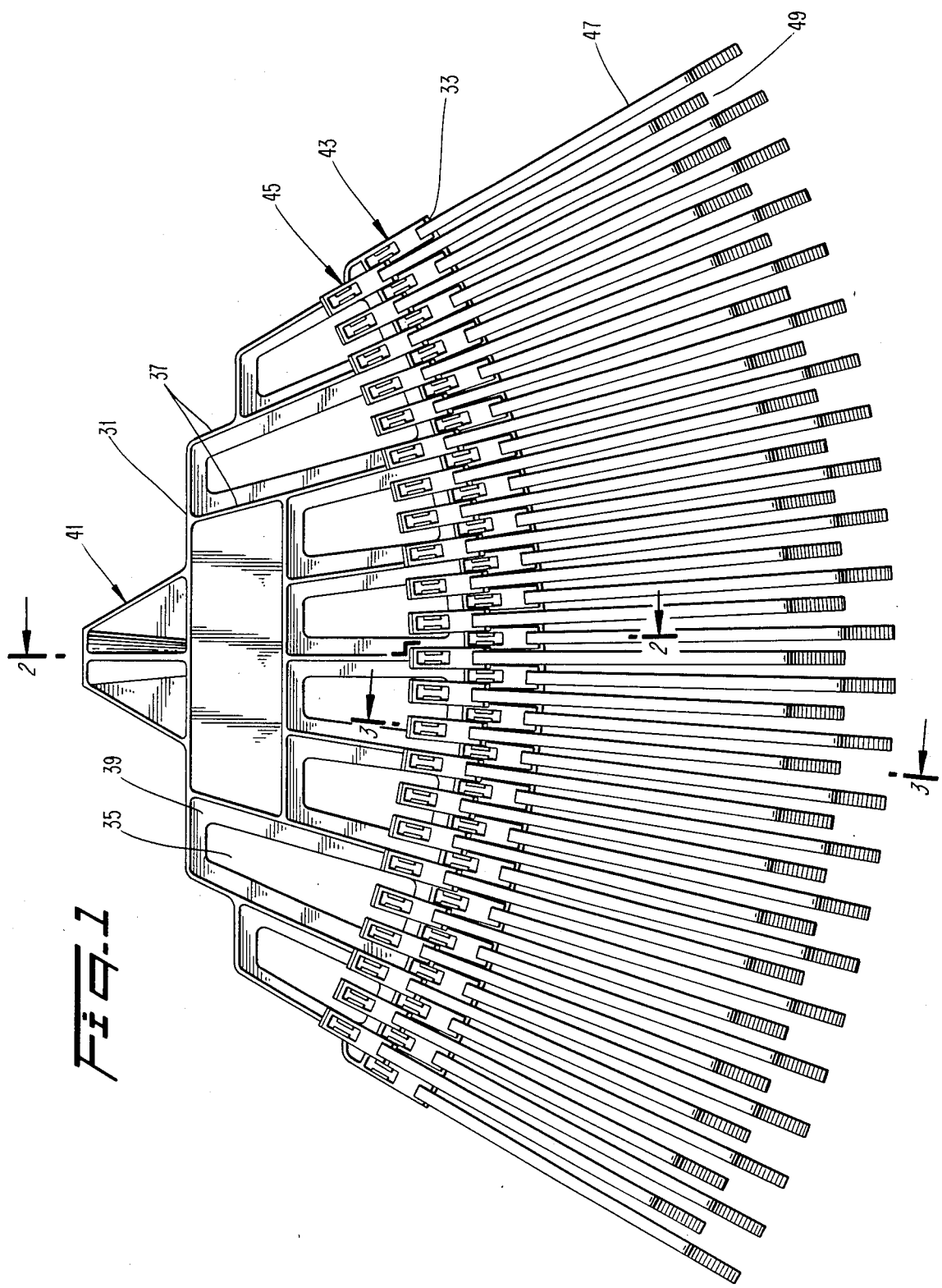

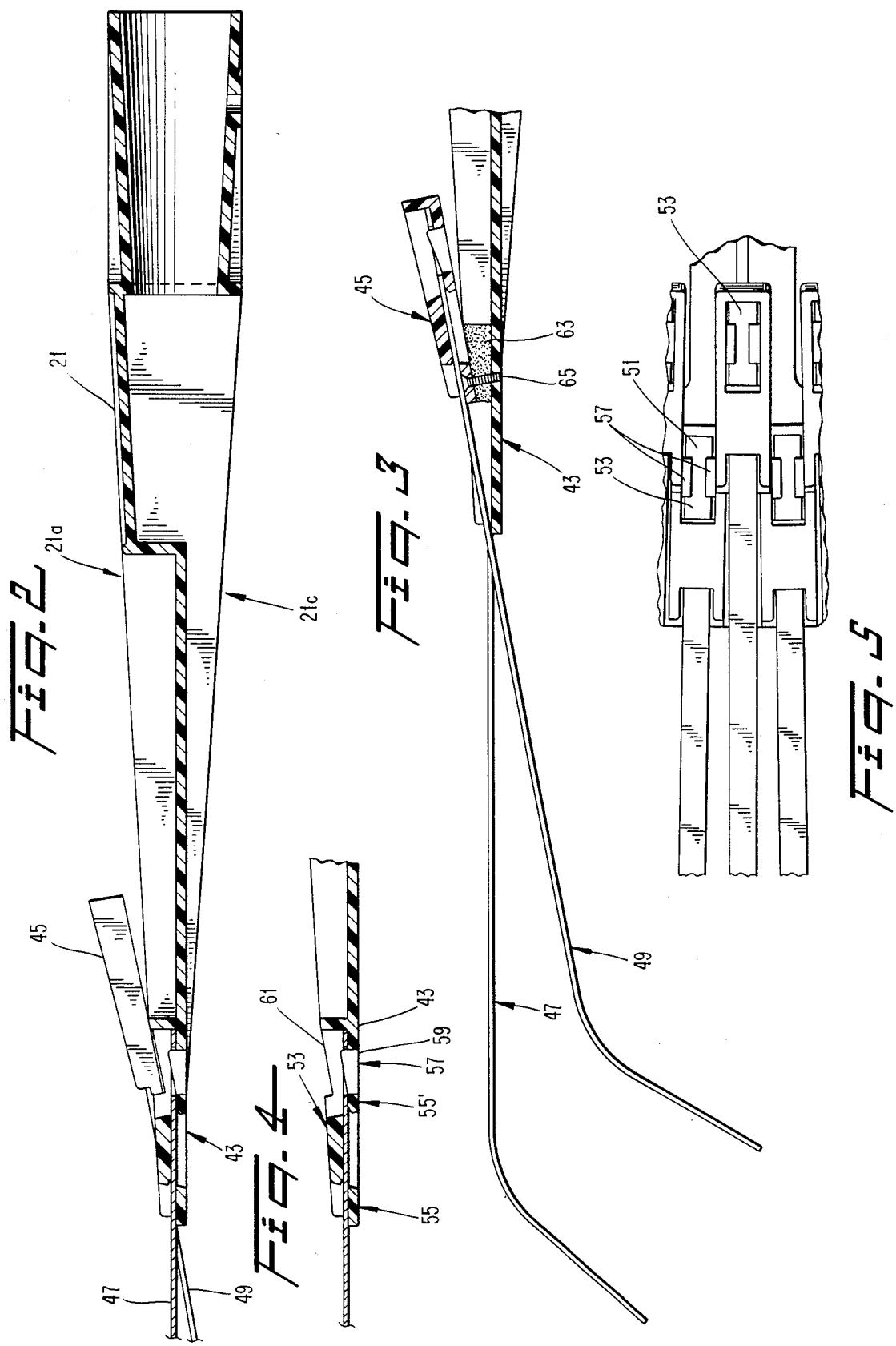

RAKE HEAD

BACKGROUND AND SUMMARY OF THE INVENTION

The present invention relates to a rake head for a lawn or garden rake. More particularly, the present invention relates to a rake head having two separate rows of tines arranged in a predetermined spaced relationship and attached to a support member.

Rake heads containing plural rows of tines are known in the art as exemplified by U.S. Pat. Nos. 1,925,357; 2,707,366; 3,332,223; and 4,150,528.

U.S. Pat. No. 1,925,357 discloses a rake with individually adjustable tines that may be set in any of three positions or may be removed. In this manner, one, two, or three vertically disposed parallel groups of tines may be obtained, each grouping containing as few as one third of the total number of rake tines.

U.S. Pat. No. 2,707,366 discloses a rake which is self-cleaning. The tines of the rake are disposed at different angles in relation to the plane of the rake head, either by weaving them in an alternating "over-under-over" fashion or by physically bending alternating tines out of the common rake plane. When the rake is removed from the ground after a raking stroke, the action of the tines of the rows returning to their original position frees any material that may have lodged between the tines during raking.

U.S Pat. No. 3,332,223 discloses a rake with two rows of tines. A first row of tines is secured at an end of the rake head and a second row of tines is secured under and behind the first row. There is also an indentation in the rake head which is abutted by the end of the first row of tines and which acts to bend each tine of the second row of tines into a lower orientation. The result is a rake with two rows of tines, staggered horizontally and vertically. Due in part to the way in which the lower tines are held in place, there is an inequality in the tension exerted upon the two rows of tines, and the range of movement of the second row of tines relative to the first row of tines is restricted.

U.S. Pat. No. 4,150,528 discloses an adjustable tine rake including U-shaped tines that are disposed parallel to one another such that two horizontally disposed raking planes are formed. The height of the tines can be modified by moving the tines through a U-shaped housing to achieve variable tine stiffness.

Additionally, molded plastic rake heads are known in the art as exemplified by U.S. Pat. Nos. 3,707,835; 3,724,188, and 4,215,528. U.S. Pat. No. 4,215,528 relates to a molded plastic rake head having molded plastic receptacles for attaching removable tines to the rake head.

However, previously known rake heads containing plural rows of tines have not proven to be fully successful because of a number of drawbacks and inefficiencies. Generally, past plural row rakes have been bulky and relatively expensive to make, due in part to the material used for and the complexity of the construction of the rake head. Because of the inequality in the arrangement and attachment of tines to the rake head, a limited range of comfortable raking angles is available. Further, because of the relatively restricted movement of the tines of one row relative to another row of tines, an unequal amount of pressure may be placed on the tines of one row while attempting to obtain engagement of the tines of the other row with the surface to be raked. This unequal application of pressure may cause damage to the raked surface and/or to the rake head.

Further, because of the relative angles at which the rows of tines are secured with respect to each other, and the resulting amount of separation between the rows of tines when they engage the surface to be raked, the rakes of the prior art may suffer from incomplete raking requiring a greater number of raking strokes to effectively remove leaves and other objects from the raked area and/or may suffer from clogged raked material between the rows of tines.

It is therefore an object of the present invention to provide a rake head for a lawn or garden rake that overcomes the problems and deficiencies of the prior art.

It is another object of the present invention to provide a rake head for a lawn or garden rake that allows for comfortable raking over a relatively wide range of angles with both rows of tines engaging the surface to be raked.

It is still another object of the present invention to provide a rake head for a lawn or garden rake that will not damage the raked surface or cause undue stress on the rake head or either row of tines during use.

It is yet another object of the present invention to provide a rake head that will allow for more efficient raking with less strokes.

It is a further object of the present invention to provide a rake head that is lighter in weight than previous rakes, particularly prior rakes with plural rows of tines.

It is also an object of the present invention to provide a rake head for a lawn or garden rake that is relatively inexpensive to manufacture.

It is also an object of the present invention to provide for a rake head that provides a partial mulching function of the material being raked.

These and other objects are accomplished by a rake head according to the present invention.

In accordance with one aspect of the present invention, there is provided a rake head with a substantially planar support member defining a first plane. An opening for attaching a rake handle is provided along a first edge of the support member and disposed within the first plane. A first arrangement for attaching a plurality of tines is provided on the support member along a second edge of the support member generally opposite from the opening for attaching the rake handle. A first plurality of tines are secured in the first arrangement for attaching and extend generally in the first plane and radiate in a direction away from the second edge. A second arrangement for attaching a plurality of tines arranged on the support member is provided with a second plurality of tines secured in the second arrangement for attaching a plurality of tines at an angle relative to the first plane. The second plurality of tines extend in a second plane with each of the tines of the second plurality of tines extending between adjacent tines of the first plurality of substantially L-shaped tines and passing through the first plane outside of the second edge. The pluralities of tines are separated to form two substantially identical rows of raking tines.

In accordance with another aspect of the present invention, a rake head has a substantially planar support member defining a first plane. A first arrangement for attaching a plurality of tines is provided on the support member. A second arrangement for attaching a plurality of tines is provided on the support member. A first plurality of tines is attached to the support member by the first arrangement for attaching and extends generally in the first plane and radiates in a direction away from the second edge. A second plurality of tines is attached to the support member by a second arrangement for attaching, wherein the second plurality define and extend in a second plane and generally radiate in the same direction as the first plurality of tines. Each tine of the first plurality of tines is substantially the same dimension as each tine of the second plurality of tines. The first arrangement for attaching and the second arrangement for attaching the pluralities of tines provide the pluralities of tines attached thereto with a substantially equal degree of movement and stress.

In a preferred embodiment, the first and the second arrangements for attaching a plurality of tines are identical.

In a further preferred embodiment of the present invention, there is provided a rake head wherein the first and the second pluralities of tines are removable and reattachable.

Further, it is preferred that the tines of the first and second pluralities of tines are comprised of metal while the support member is comprised of a polymer.

The present invention provides numerous advantages over prior rake heads having single and double rows of tines. For example, the first and second arrangements for attaching the tines secure the rows of tines, such that the stress and degree and range of movement of each of the tines of the first and second pluralities are substantially equal. The pluralities of tines attached in the manner of the present invention yield substantially identical raking performance allowing for more even, consistent and efficient raking. With the pluralities of tines being equally stressed and having the same relative degree and range of movement, equal pressure is exerted by each plurality of tines upon the surface to be raked (e.g., lawn). This equal pressure minimizes the chances of damaging the raked surface, the rake head, or either plurality of tines by the application of a greater force upon the rake head and one plurality of tines while attempting to obtain greater contact between the other plurality of tines and the raking surface. In a particularly preferred embodiment, the above advantages are accomplished by use of identical first and second arrangements for attaching the tines to the support member.

Furthermore, the second arrangement for attaching the tines is situated upon the support member such that it is closer to an opening for attaching a rake handle than is the first arrangement for attaching the first row of tines. The second arrangement is oriented at an angle with respect to the first arrangement such that the second plurality of tines secured thereto will extend between adjacent tines of the first plurality of tines at a point outside of a second edge of the support member. Because of the angle at which the pluralities of tines are retained relative to each other, the resulting separation of tines allows the rake head to more efficiently and effectively remove objects from the surface to be raked and also provides a mulching function with regard to leaves. Further, by properly selecting the relative angle of retention of the tines, a sufficient divergence of the tines of the two pluralities is provided such that leaves and other raked matter will not readily get caught between the pluralities. Additionally, because of the relative angle at which the pluralities are arranged, the relative unrestricted upward mobility, the equal stress and the equal dimensions of the individual tines, the rake head can be used at a wider range of raking angles relative to the raking surface, with both pluralities of tines in intimate contact with the raking surface. This provides for a wider range of comfortable operating positions for use of a rake with the rake head of the present invention, without any loss of raking efficiency.

Further, the preferred embodiment of the rake head of the present invention includes a first and a second plurality of tines with each tine of the first plurality being of substantially the same dimensions and composed of the same material as each tine of the second plurality. The dimensional and material equality of the tines is advantageous because every tine has the same properties. Additionally, in the preferred embodiment all of the tines may be removable and re-attachable to the support member, in which case all of the tines are interchangeable. Thus, it is only necessary to produce and store one size and type of replacement tines.

The rake head of the present invention is preferably constructed of a support member which is composed of a polymer, copolymer or mixture of polymers and/or copolymers, and may additionally contain fillers such as glass or plastic fiber, particulate, diatomaceous earth, cellulosic fiber, and the like (hereinafter referred to as polymer). Polymeric material has the advantages of lighter weight, relatively lower production costs, flexibility, and shock resistance, while at the same time providing sufficient rigidity and durability to permit years of effective service. Additional support structures may easily be molded into the support member to increase strength and rigidity or may be removed from the support member molding to provide greater flexibility and shock resistance, etc. Material may also be removed from the polymeric support member such that voids or cut-outs are formed, thus lowering the amount of material required for construction of the rake head and further lowering the production costs and the weight.

BRIEF DESCRIPTION OF THE DRAWINGS

Preferred embodiments of the present invention will be described in greater detail with reference to the accompanying drawings, wherein like members bear like reference numerals and wherein:

FIG. 1 is a top view of a rake head embodying a preferred embodiment of the present invention;

FIG. 2 is a cross-sectional view of the rake head of the present invention taken along the line 2—2 of FIG. 1;

FIG. 3 is a cross-sectional view of a portion of the rake head taken along the line 3—3 of FIG. 1;

FIG. 4 is a cross-sectional view of another portion of FIG. 1; and

FIG. 5 is an expanded top view of a portion of FIG. 1.

DETAILED DESCRIPTION OF THE PREFERRED EMBODIMENTS

In a preferred embodiment of the rake head of the present invention, a substantially planar support member 21 is provided that defines a first plane, having a first side 21a which is oriented in a generally upward direction during raking, and a second side 21c which is oriented in a generally downward direction during raking. The support member 21 of the present invention may be made of a polymer, copolymer, or mixture of polymers and/or copolymers and may additionally contain fillers such as glass, plastic or cellulosic fiber, diatomaceous earth, particulate, and the like. Portions of the support member may be generally similar in construction to the support member of the rake described in U.S. Pat. No. 4,215,528 which is herein incorporated by reference.

With reference to FIG. 1 and a preferred embodiment of the rake head of the present invention, the support member 21, has a first edge 31 and a second edge 33. The first and second edges are not necessarily parallel, straight, or continuous, however, they must be oriented such that they generally oppose each other.

The support member 21 may be solid and continuous, containing no breaks, gaps, or voids. However, voids 35, may advantageously be incorporated into the support member to provide for lighter weight, lower production cost, increased flexibility and increased shock resistance. Other structures such as ridges 37 and/or ledges 39 may also be employed to impart added strength and rigidity. It should be understood that the support member 21 is not limited to these specific design features. Any structure which is sufficiently rigid to support tines during raking may be used in the practice of the present invention.

The support member 21 has an arrangement, for example, an opening 41, along the first edge 31 for attaching a rake handle (not shown) to the support member 21 in a well known manner. The opening 41 is oriented such that a rake handle attached thereto will extend generally within the first plane defined by the support member 21 and radiate away from the first edge 31 of the support member 21.

Also arranged on the support member 21 is a first arrangement 43 for attaching a plurality 47 of tines. The first arrangement 43 for attaching is situated along the second edge 33 of the support member 21 generally opposite from the opening 41 and is oriented such that a first plurality 47 of tines, secured thereto will extend generally within the first plane defined by support member 21, and radiate away from the second edge 33. Preferably, the configuration of the first arrangement 43 for attaching and/or the length of the tines are selected such that the plurality 47 of tines attached thereto lie along a curved path providing better raking. The first arrangement 43 for attaching may be any structure capable of securing and retaining any or all tines of the first plurality 47 of tines. The first arrangement 43 for attaching may be attached to the support member 21 by any method known in the art. However, in a preferred embodiment, it is integrally molded with the support member 21.

With reference to FIGS. 4 and 5, the first arrangement 43 for attaching comprises a pocket 61 into which a tine of the first plurality 47 may be inserted. The first arrangement 43 for attaching also has a top structure 53, bottom structures 55 and 55' and a pair of opposed cams 57 on either side of an access hole 59 located on the underside of the support member 21. When mounting a tine of the plurality 47 into the first arrangement 43 for attaching, a mounting end 51 of a tine of the plurality 47 is inserted over the first bottom structure 55, then under the top structure 53, then over the second bottom structure 55', until the end of the tine rides up upon the pair of opposed cams 57. Once a tine of the plurality 47 reaches the top of cams 57 the T-shaped notched mounting end 51 of the tine of the plurality 47 snaps into place and the tine of the plurality 47 returns to a flat orientation with the notches engaging the respective cams 57. That tine of the plurality 47 is removable by lifting the mounting end 51 above the cams 57 by use of any object, such as a screwdriver, inserted into access hole 59 followed by force applied to pull the tine of the plurality 47 down cams 57 and out the first arrangement 43 for attaching. A more detailed description of the illustrated embodiment of the first arrangement 43 for attaching, may be found in U.S. Pat. No. 4,215,528.

The second arrangement 45 for attaching tines is situated upon the support member 21 such that it is closer to the opening 41 than is the first arrangement 43 for attaching, i.e., near the second edge 33 and closely adjacent to the first arrangement 43 for attaching tines. The second arrangement 45 is positioned such that a second plurality 49 of tines, secured thereto extend generally in a second plane. Each of the tines of the second plurality 49 of tines extends between adjacent tines of the first plurality 47 of tines and passes through the first plane defined by the support member 21 outside of the second edge 33 of the support member 21 (FIGS. 2 and 3).

The second arrangement 45 for attaching is attached to the support member 21, for example, by a wedge 63, such that the second plurality 49 of tines pass through the first plane containing the first plurality 47 of tines at a point outside of edge 33 and terminates at a point closer to the second edge 33 of the support member 21 than the point at which the first plurality 47 of tines terminates. The free ends of the second plurality 49 of tines are arranged in the same configuration as the first plurality 47 of tines, i.e., the distance from a free end of one first tine of the plurality 47 and an adjacent tine of the second plurality 49 is constant. The wedge 63 also provides for a separation of the pluralities of tines by displacing the second plurality 49 in a direction perpendicular to the first plane of the support member 21 as they radiate away from the support member 21 past the point at which the first and second planes intersect, outside of the second edge 33. The angle of the wedge 63 is selected such that a sufficient separation of the tines is provided, particularly at the free ends. However, the separation of the free ends of the rows of tines cannot be so large that engagement of both rows of tines is prevented. This separation is arranged to produce a rake head with increased efficiency because of the formation of two substantially identical rows of raking tines which provide better coverage of the area being raked. Moreover, the free ends of the pluralities of tines are spaced sufficiently far relative to each other such that the rows of tines of the rake head act to mulch leaves during raking, i.e., the rows are close enough to engage a leaf caught by the first row with the second row. However, the rows must be spaced sufficiently for the rake head to remain substantially free of leaves that might otherwise clog between the pluralities of tines.

The positioning of the second arrangement 45 for attaching may be accomplished, for example, by the use of the wedge 63 attached to the support member 21 atop which is affixed the second arrangement 45 for attaching, by a screw 65, as illustrated in FIG. 3. The second arrangement 45 for attaching and the wedge 63 may be affixed to the support member 21 by any method known to the art, such as glue, rivets, welding, etc., however, they are preferably integrally molded with the support member 21.

In a preferred embodiment, a separation of the pluralities of tines at the free ends of between about 3.0 to about 4.0 cm is preferable, with between about 3.5 to about 3.8 cm most preferred. Additionally, in a preferred embodiment it has been determined that the angle between the pluralities of tines is preferably between about 10° and about 25° with about 13° to about 17° being most preferred. These dimensions and angles have been found to be effective for accomplishing the objects of the present invention.

The movement of the tines of pluralities 47 and 49, when engaged with a surface to be raked is away from the first side 21a of support member 21 and in a direction generally perpendicular to the plane of the support member 21, i.e., an upward direction. The arrangements 43 and 45 for attaching pluralities 47 and 49 permit a greater degree and range, movement, and flexibility in the generally upward direction away from the side 21a which is required during raking. Therefore, while the angle at which pluralities 47 and 49 are held (approximately 15° relative to one another) may be slightly different, each of the tines of the pluralities have a substantially equal degree and range of movement particularly in a direction perpendicular to the plane of the support member 21, i.e., a generally upward direction during raking. Any arrangement for attaching that will provide for the proper degree and range of movement, the proper positioning of the tines secured thereto, the proper angle and amount of separation and allows for the second plane defined by the second plurality 49 of tines to cross the first plane defined by the support member at a point outside of the second edge 33 will accomplish the object of the present invention. As illustrated, one relatively simple and inexpensive manner of achieving the substantially equal degree of and range of movement is to provide a second arrangement 45 for attaching identical in structure to the first arrangement 43 for attaching (FIGS. 3 and 5).

It is preferred that the first plurality 47 of tines and the second plurality 49 of tines are substantially L-shaped as illustrated in FIG. 3 and contain a substantially T-shaped, notched, mounting end 51 and 53 respectively at an end of each tine of the pluralities, as illustrated in FIG. 5. It is also preferred that each tine of the first plurality 47 of tines is substantially of the same dimensions and is made of substantially the same material as each tine of the second plurality 49 of tines.

The principles, preferred embodiments and modes of operation of the present invention have been described in the foregoing specification. The invention which is intended to be protected herein, however, is not to be construed as limited to the particular embodiments disclosed, since these are to be regarded as illustrative rather than restrictive. Variations and changes may be made by others without departing from the spirit and scope of the invention.

What is claimed is:

1. A rake head comprising:
   a substantially planar, support member defining a first plane;
   means for attaching a rake handle provided on a first edge of said support member and disposed within said first plane;
   first means for attaching a plurality of tines provided on said support member disposed along a second edge of said support member, said second edge being generally opposite from said means for attaching said rake handle;
   a first plurality of tines secured in said first attaching means and extending generally in said first plane and radiating in a direction away from said second edge, said tines of said first plurality having their free ends bent in a common direction;
   second means for attaching a plurality of tines arranged on said support member; and
   a second plurality of tines secured in said second means for attaching a plurality of tines at an angle relative to said first plurality of tines, and extending in a second plane oriented at an angle to said first plane, each of said tines of said second plurality of tines extending between adjacent tines of said first plurality of tines and passing through said first plane outside of said second edge; a separation of said pluralities of tines being provided to form two substantially identical rows of raking tines, said tines of said second plurality having their free ends bent in the same common direction as said tines of said first plurality so that said free ends of said first and second pluralities can simultaneously engage the ground.

2. The rake head of claim 1, wherein said first means for attaching and said second means for attaching the pluralities of tines provides each tine of said first and second pluralities with a substantially equal degree and range of movement.

3. The rake head of claim 1, wherein each tine of said first plurality of tines is of substantially the same dimensions as each tine of said second plurality of tines.

4. The rake head of claim 3, wherein all of said tines are composed of the same material.

5. The rake head of claim 4, wherein said tines are composed of metal.

6. The rake head of claim 1, wherein said support member is composed of a polymer.

7. The rake head of claim 1, wherein said first and said second means for attaching a plurality of tines are identical.

8. The rake head of claim 1, wherein said first plurality of tines are removable and re-attachable.

9. The rake head of claim 1, wherein said second plurality of tines are removable and re-attachable.

10. A rake head comprising:
    a substantially planar support member defining a first plane;
    first means for attaching a plurality of tines provided on said support member;
    second means for attaching a plurality of tines provided on said support member behind and closely adjacent said first means for attaching;
    a first plurality of tines attached to said support member by said first means for attaching and extending generally in said first plane, said tines of said first plurality having their free ends bent in a common direction;
    a second plurality of tines attached to said support member by said second means for attaching and extending in a second plane angled with respect to said first plane, said tines of said second plurality having their free ends bent in the same common direction as said tines of said first plurality so that said free ends of said first and second pluralities can simultaneously engage the ground;
    each tine of said first plurality of tines being of substantially the same dimensions as each tine of said second plurality of tines;
    said first means for attaching defining first flexure points about which said first plurality of tines flex, said second means for attaching defining second flexure points about which said second plurality of tines flex, said second flexure points spaced rearwardly of said first flexure points to define a corresponding rearward spacing of said free ends of said second plurality relative to said free ends of said first plurality, to provide all of said tines with a substantially equal degree and range of movement and equal stresses.

11. The rake head of claim 10, wherein said second plurality of tines extends in a second plane and each tine of said second plurality of tines extends between adjacent tines of said first plurality and passes through said first plane of said support member outside of said support member.

12. The rake head of claim 10, wherein said tines are composed of the same material.

13. The rake head of claim 12, wherein said tines are composed of metal.

14. The rake head of claim 10, wherein said support member is composed of a polymer.

15. The rake head of claim 10, wherein said first and said second means for attaching a plurality of tines are identical.

16. The rake head of claim 10, wherein said first plurality of tines are removable and re-attachable.

17. The rake head of claim 10, wherein said second plurality of tines are removable and re-attachable.

* * * * *